Patented June 14, 1938

2,120,567

UNITED STATES PATENT OFFICE 2,120,567

GOLF BALL COVER

James A. Merrill, Akron, Ohio, assignor to Wingfoot Corporation, Wilmington, Del., a corporation of Delaware No Drawing. Application November 4, 1933, Serial No. 696,689

3 Claims. (Cl. 273—62)

This invention relates to golf ball covers. It includes golf balls to which the new covering material has been applied and the method of making such golf balls.

According to this invention a golf ball center which may be prepared in any usual way is covered with a composition which includes a thermoplastic rubber derivative and the composition is applied to the golf ball center by molding under pressure with heating. The thermoplastic rubber derivative used in the golf ball cover has less chemical unsaturation than rubber itself and is therefore referred to as a derivative having a $(C_5H_8)_x$ structure in which more carbon atoms are directly connected than in rubber. It may be a hydrocarbon having the empirical formula $(C_5H_8)_x$ although rubber derivatives containing other elements may be employed and for various reasons. These are all condensation derivatives of rubber. A chlorine-containing rubber derivative which is apparently a hydrogen chloride addition product with a $(C_5H_8)_x$ nucleus is preferred.

The thermoplastic rubber derivatives are resilient and when mixed with a rubber-like material, form a cover which is not easily cut and will withstand the shock of the impact of the golf club on the ball and furthermore, such covers have a good surface which is hard and smooth. Balata, gutta percha and plasticizers and filling material, etc. may be added to the covering composition. The covering may be vulcanized although an unvulcanized covering is very satisfactory. In general it is desirable to apply a surface coating of paint to the cover as is usual in the manufacture of golf balls.

A chlorine-containing rubber derivative which has given very satisfactory results may be prepared in the following way. Pale crepe rubber is milled until it has a plasticity of about 300 as measured by a Williams plastometer. A sufficient amount of this plasticized rubber is dissolved in benzene to make a 10% cement. To this cement there is added 10% of crystalline hydrated chlorostannic acid based on the weight of the rubber. The solution is heated to boiling under a reflux condenser and the heating continued until a product is obtained which on decomposition in water will give a product with a hardness of 83–84 at 25° C. as measured by a Shore hard rubber durometer. The reaction of the chlorostannic acid on the rubber is advantageously controlled by sampling and determining the viscosity of the samples. When the reaction has proceeded to the desired point water or sodium hydroxide is added in sufficient quantity to stop any further reaction. One-half pound of water per pound of chlorostannic acid used is satisfactory for this purpose.

The reaction product is then added to somewhat more than its own volume of water, for example, 2½ gallons of water per gallon of reacted cement. The emulsion thus formed is steam-distilled with agitation to remove the solvent, and the reaction product, which is a condensation derivative of rubber, is precipitated as a light-colored, finely divided material. This is centrifuged and dried in a vacuum.

A suitable product may also be obtained from "dead milled" pale crepe rubber, that is, rubber with a plasticity of around 100–115. A 12% solution of such dead milled rubber in benzene is reacted with 10% of crystalline chlorostannic acid and the product thus obtained steam-distilled and precipitated in water. The reaction of the chlorostannic acid on the rubber is terminated when the intermediate product thus obtained yields on quenching in water a final product with a hardness of 83–84 at 25° C.

The golf ball covering material is made from such a chlorine-containing thermoplastic derivative in the following way. 10 parts of titanium oxide and 60 parts of the chlorine-containing rubber derivative are mixed together on a rubber mill preferably heated to around 100–120° F. 40 parts of pale crepe rubber are added to this mixture on the mill a little at a time. A very small quantity of rubber is first added and the remainder is then added in slightly increasing amounts. If too much rubber is added at the beginning the product tends to crumble and cannot be milled satisfactorily.

The composition may be formed into hemispherical cups in a hot mold using a temperature of 200° to 220° F., then cooled and two cups thus formed placed around a suitable golf ball center and molded in place at a temperature of about 240° to 260° F. using a pressure of 1000 pounds. The cups are molded at an elevated temperature to insure their retaining their shape until applied to the golf ball center. The ball formed in this way has long life, gives a good distance when properly hit and the cover is not easily damaged.

Instead of forming the material into cups it may be calendered to desired thickness, cut into discs about 2 inches in diameter and the discs heated until they become soft. The softened discs are fitted into the two halves of the mold and then molded around the center.

If a vulcanized cover is desired it may be obtained by adding to the above formula 1 part of sulfur, 1 part of mercaptobenzothiazole, 0.5 part of tetra methyl thiuram disulfide and 5 parts of zinc oxide. The vulcanizing ingredients are advantageously milled into the composition on a rubber mill and the curing may take place at 250–270° F. and is preferably carried out at about 260° F.

It has been found that if balata is added to the thermoplastic rubber derivative and rubber it is not necessary to regulate the chlorostannic acid reaction to produce a product of the hardness specified above. A somewhat harder or softer material may be used and more or less rubber may be combined with it. However, a rubber derivative of about the hardness specified is preferred. For example, about equal parts of rubber and the rubber derivative may be used. Formulae which have given satisfactory results include the following:

Formula I

| | Parts |
|---|---|
| Deresinated balata | 36 |
| Rubber derivative | 29 |
| Pale crepe rubber | 26 |
| Titanium oxide | 9 |

Formula II

| | Parts |
|---|---|
| Deresinated balata | 35 |
| Rubber derivative | 65 |
| Pale crepe rubber | 35 |
| Titanium oxide | 10 |

Formula III

| | Parts |
|---|---|
| Deresinated balata | 35 |
| Rubber derivative | 70 |
| Pale crepe rubber | 30 |
| Titanium oxide | 10 |

Formula IV

| | Parts |
|---|---|
| Deresinated balata | 35 |
| Rubber derivative | 60 |
| Pale crepe rubber | 40 |
| Titanium oxide | 10 |

The titanium oxide is used to give a light-colored product. Other pigments may be employed for this purpose.

Cups may be made from any of the above formulae in either a hot or a cold mold and the cups thus formed molded onto a suitable golf ball center. Covers may also be made of discs made from the above mixtures.

Covers of this type may be vulcanized by adding 1 part of sulfur, 5 parts of zinc oxide and a suitable accelerator, such as 1 part of mercaptobenzothiazole and 0.5 part of tetra methyl thiuram disulfide. These ingredients are advantageously incorporated with the composition on a rubber mill. In compounding it is preferred to first add the rubber to the rubber derivative and then add the balata. The rubber is advantageously added in small increments. The vulcanizing materials may then be added. According to another method of mixing, the vulcanizing materials are added to a small amount of the rubber. This mixture is added to the balance of the rubber, balata and rubber derivative after they have been milled together.

Instead of employing chlorostannic acid to produce the chlorine-containing rubber derivative described above, tin tetra chloride may be used in the presence of hydrochloric acid as by adding an aqueous hydrochloric acid solution to the mixture. Instead of tin tetra chloride, chromic chloride and other halides of amphoteric metals may be employed with hydrochloric acid to form a chlorine-containing rubber derivative. Ferric chloride and other compounds which produce dark-colored products may be used altho the lighter-colored products give a better appearing ball.

A rubber derivative which does not contain combined chlorine may be used in forming the golf ball covers. For example, a suitable derivative is one formed by reacting a benzene cement with tin tetra chloride, quenching the reaction mixture in a large volume of water and then removing the solvent by steam distillation. The reaction of the tin tetra chloride is so controlled as to produce a final product of the desired hardness. If the rubber derivative is to be used with rubber alone with possibly the addition of inert fillers, such as titanium oxide, the reaction is controlled so as to produce a product with a hardness of 83–84 at 25° C. Rubber may be mixed with this product as with the chlorine-containing product to produce a golf ball cover. Balata, etc. may also be added with a rubber derivative of this type. Sulfur may be added to any such mixture and the cover vulcanized if desired.

Rubber derivatives similarly produced by the reaction of other halides of amphoteric metals and rubber, such as chromic chloride, aluminum chloride, ferric chloride, etc. with subsequent quenching may likewise be used with rubber-like materials to make the golf ball covers of this invention.

These covers are tough and durable. The balls give good distance when properly hit and have long life. It is intended that the application shall cover by suitable expression in the appended claims whatever features of patentable novelty reside in the invention. In the claims "rubber-like material" means rubber, balata, gutta percha or an equivalent material.

What I claim is:

1. A golf ball which comprises a center and a cover molded on the center which cover is composed substantially entirely of an admixture of at least one rubber-like material and a thermoplastic rubber derivative with a Shore hardness in the eighties, which rubber derivative is obtainable by treating with water the reaction product of rubber and the halide of an amphoteric metal or chlorostannic acid, said cover being not easily cut due to the fact that the weight of the rubber derivative is equal to between 32 and 60% of the combined weight of the rubber derivative and rubber-like material present in the cover.

2. A golf ball having a cover as in claim 1, said cover comprising as rubber-like materials, substantial amounts of both rubber and balata.

3. A golf ball having a cover as in claim 1, said cover being vulcanized.

JAMES A. MERRILL.